(12) United States Patent
Manczak et al.

(10) Patent No.: US 8,302,077 B2
(45) Date of Patent: Oct. 30, 2012

(54) METHOD AND SYSTEM FOR CONFIGURING SOFTWARE MODULES TO EXECUTE IN AN EXECUTION ENVIRONMENT

(75) Inventors: Olaf Manczak, Hayward, CA (US); Eric C. Lalonde, Mountain View, CA (US); Christopher A. Vick, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 839 days.

(21) Appl. No.: 12/403,751

(22) Filed: Mar. 13, 2009

(65) Prior Publication Data

US 2010/0235813 A1  Sep. 16, 2010

(51) Int. Cl.
*G06F 9/44* (2006.01)
(52) U.S. Cl. .......... 717/121; 717/107; 717/120
(58) Field of Classification Search .......... None
See application file for complete search history.

(56) References Cited

U.S. PATENT DOCUMENTS

| | | | | |
|---|---|---|---|---|
| 7,017,149 | B2* | 3/2006 | Hanis | 717/121 |
| 7,401,325 | B2* | 7/2008 | Backhouse et al. | 717/121 |
| 7,840,942 | B2* | 11/2010 | Duffield et al. | 717/121 |
| 7,877,727 | B2* | 1/2011 | Sharp et al. | 717/107 |
| 7,890,930 | B2* | 2/2011 | Mills | 717/120 |
| 7,895,308 | B2* | 2/2011 | Tindall et al. | 717/120 |
| 7,971,047 | B1* | 6/2011 | Vlaovic et al. | 713/1 |
| 2003/0055746 | A1* | 3/2003 | Bishop | 705/27 |
| 2003/0140333 | A1* | 7/2003 | Odaka et al. | 717/107 |
| 2004/0153469 | A1* | 8/2004 | Keith-Hill | 707/101 |
| 2006/0112297 | A1* | 5/2006 | Davidson | 714/2 |
| 2006/0218544 | A1* | 9/2006 | Chakraborty et al. | 717/168 |
| 2007/0214348 | A1* | 9/2007 | Danielsen | 713/2 |
| 2007/0294669 | A1* | 12/2007 | Robalewski et al. | 717/120 |
| 2008/0263519 | A1* | 10/2008 | Bognar | 717/121 |
| 2009/0144700 | A1* | 6/2009 | Huff et al. | 717/121 |
| 2009/0265687 | A1* | 10/2009 | Dhanakshirur et al. | 717/121 |
| 2010/0037206 | A1* | 2/2010 | Larimore et al. | 717/109 |
| 2010/0088699 | A1* | 4/2010 | Sasaki | 718/1 |
| 2010/0218084 | A1* | 8/2010 | Sivadas et al. | 717/121 |
| 2010/0235831 | A1* | 9/2010 | Dittmer | 718/1 |

OTHER PUBLICATIONS

M.A. Hiltunen, Configuration Management for Highly Customisable Software, IEEE 19982298, 1998, [Retrieved on Jun. 27, 2012]. Retrieved from the internet: <URL: http://ieeexplore.ieee.org/stamp/stamp.jsp?tp=&arnumber=741288> 9 Pages (180-188).*

(Continued)

*Primary Examiner* — Don Wong
*Assistant Examiner* — Anibal Rivera
(74) *Attorney, Agent, or Firm* — Osha Liang LLP

(57) ABSTRACT

A method for configuring software modules that includes accessing a properties repository that includes a plurality of properties of the execution environment of the computer system. The method further includes generating a configuration file for each software module. Generating a configuration file includes obtaining a generator module defined for the software module, and executing the generator module to instantiate the configuration file for the software module. The generator module is configured to identify a property required for the configuration file, obtain the value for the property from the properties repository, and store the value for the property in the configuration file in accordance with a customized format required by the software module. The method further includes storing the configuration file for each of the software modules.

18 Claims, 6 Drawing Sheets

OTHER PUBLICATIONS

Jaehwan Lee et al., A framework for Automatic Generation of Configuration Files for a Custom Hardware/Software RTOS, 2002, [Retrieved on Jun. 27, 2012]. Retrieved from the internet: <URL: http://www.ece.gatech.edu/research/codesign/publications/jaehwan/paper/ERSAJaehwanLee.pdf> 7 Pages (1-7).*

Paul Ward et al., Embedding Dynamic Behavior into a Self-configuring Software System, 2008, [Retrieved on Jun. 27, 2012]. Retrieved from the internet: <URL: http://www.springerlink.com/content/w2022656154843u8/fulltext.pdf> 15 Pages (373-387).*

* cited by examiner

METHOD AND SYSTEM FOR CONFIGURING SOFTWARE MODULES TO EXECUTE IN AN EXECUTION ENVIRONMENT

BACKGROUND

A computer system provides an execution environment for the programs that execute on the computer system. The execution environment includes the hardware and software that execute with and affect the execution of the program. For example, the execution environment of a web browser includes the networking interfaces, operating system, and hardware. As another example, the execution environment of the operating system includes the hardware and the resources allocated to the operating system.

For a program to operate in the execution environment defined by the computer system, the program is typically configured for the execution environment. Specifically, a developer of the program embeds a variety of configuration variables within the program. The configuration variables define values that are specific to the execution environment and required by the program to execute. The values for the configuration variables are based on the execution environment of the program, preferences of an individual installing and/or using the program, etc. The program is able to obtain the values for the configuration variables during execution of the program.

A configuration file is used to store the configuration values for a program. A user installing or using the program can modify the configuration file to change the execution of the program. Thus, when the program is executed, the program obtains the values set by the individual and executes accordingly.

SUMMARY

In general, in one aspect, the invention relates to a method for configuring a plurality of software modules to execute in an execution environment on a computer system that includes accessing a properties repository that includes a plurality of properties of the execution environment of the computer system. Each of the plurality of properties includes a name and a value. The method further includes generating a configuration file for each of the plurality of software modules using the properties repository. Generating a configuration file includes obtaining a generator module defined for the software module, and executing the generator module on the computer system to instantiate the configuration file for the software module. The generator module is configured to identify a property of the plurality of properties required for the configuration file, obtain the value for the property from the properties repository, and store the value for the property in the configuration file in accordance with a customized format required by the software module. The method further includes storing the configuration file for each of the plurality of software modules.

In general, in one aspect, the invention relates to a system for configuring a plurality of software modules to execute in an execution environment on a computer system that includes a processor, a properties repository that includes a plurality of properties of the execution environment of the computer system. Each of the plurality of properties comprises a name and a value. The system also includes a generator manager executing on the processor and configured to generate a configuration file for each of the plurality of software modules using the properties repository. Generating the configuration file includes obtaining a generator module defined for the software module, and executing the generator module on the computer system to instantiate the configuration file for the software module. The generator module is configured to identify a property of the plurality of properties required for the configuration file, obtain the value for the property from the properties repository, and store the value for the property in the configuration file in accordance with a customized format required by the software module. The generator manager is further configured to store the configuration file for each of the plurality of software modules.

In general, in one aspect, the invention relates to a computer readable medium that includes computer readable program code embodied therein for causing a computer system to access a properties repository that includes a plurality of properties of an execution environment of the computer system. Each of the plurality of properties comprises a name and a value. The computer readable medium further causes the computer system to generate a configuration file for each of the plurality of software modules using the properties repository. Generating the configuration file includes obtaining a generator module defined for the software module, and executing the generator module on the computer system to obtain the configuration file for the software module. The generator module is configured to identify a property of the plurality of properties required for the configuration file, obtain the value for the property from the properties repository, and store the value for the property in the configuration file in accordance with a customized format required by the software module. The computer readable medium further causes the computer system to store the configuration file for each of the plurality of software modules.

Other aspects of the invention will be apparent from the following description and the appended claims.

DETAILED DESCRIPTION

Figure 1:
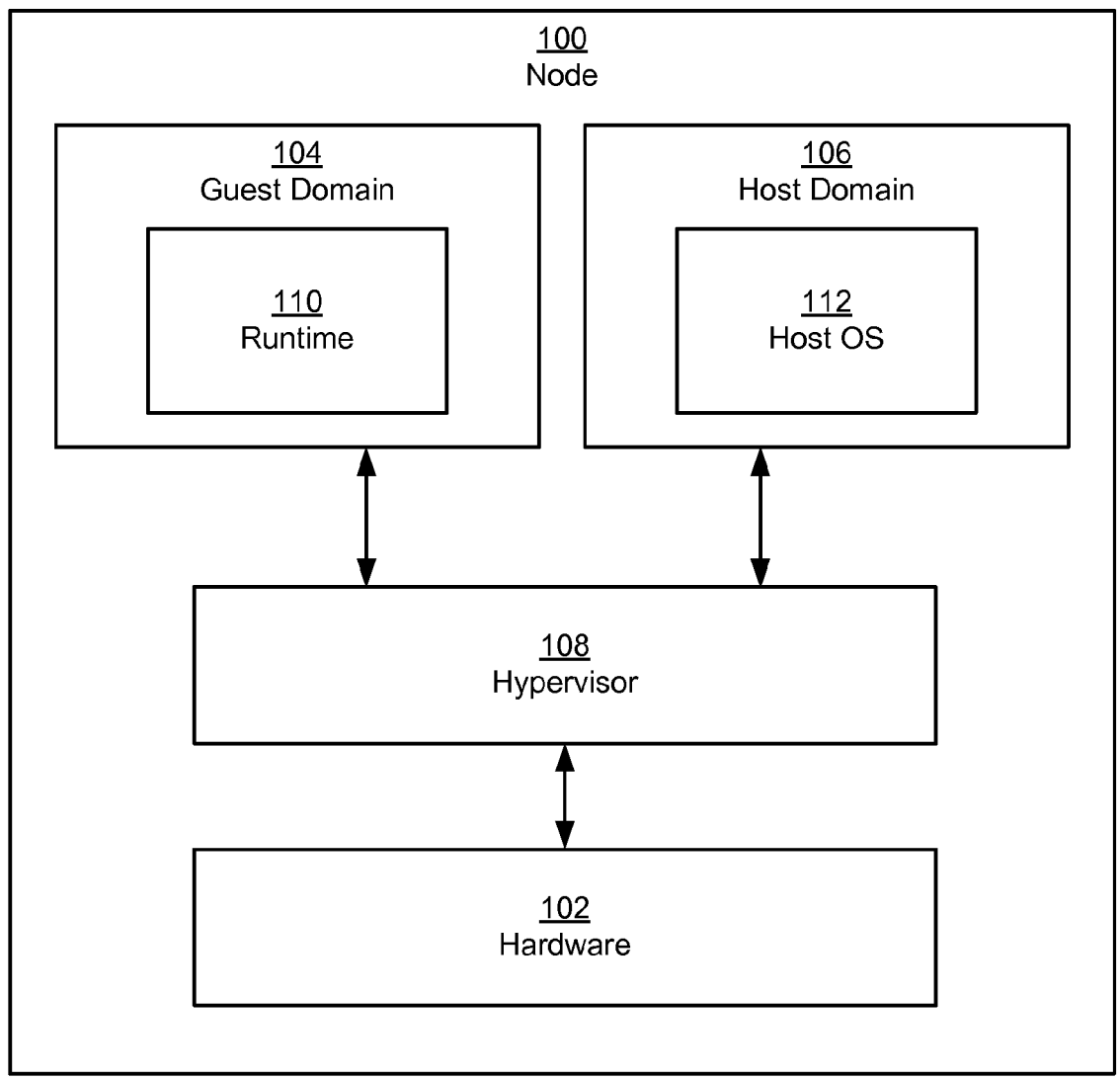
FIGS. 1 and 2 show schematic diagrams in accordance with one or more embodiments of the invention.

Specific embodiments of the invention will now be described in detail with reference to the accompanying figures. Like elements in the various figures are denoted by like reference numerals for consistency. Further, the use of "Fig." in the drawings is equivalent to the use of the term "Figure" in the description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for automatic generation of multiple configuration files. Specifically, embodiments of the invention use a single "properties" repository that provides the "properties" for each of the multiple configuration files. Further, software modules (e.g., operating system, application, or component thereof) that execute in the execution environment each have a corresponding generator module. Each generator module includes functionality to identify the properties of the execution environment required by the corresponding software module, obtain the required properties from the properties repository, and store the properties in a configuration file in accordance with the requirements of the software module. Accordingly, by executing the generator modules corresponding to each software module, embodiments of the invention create the configuration files.

Figure 2:
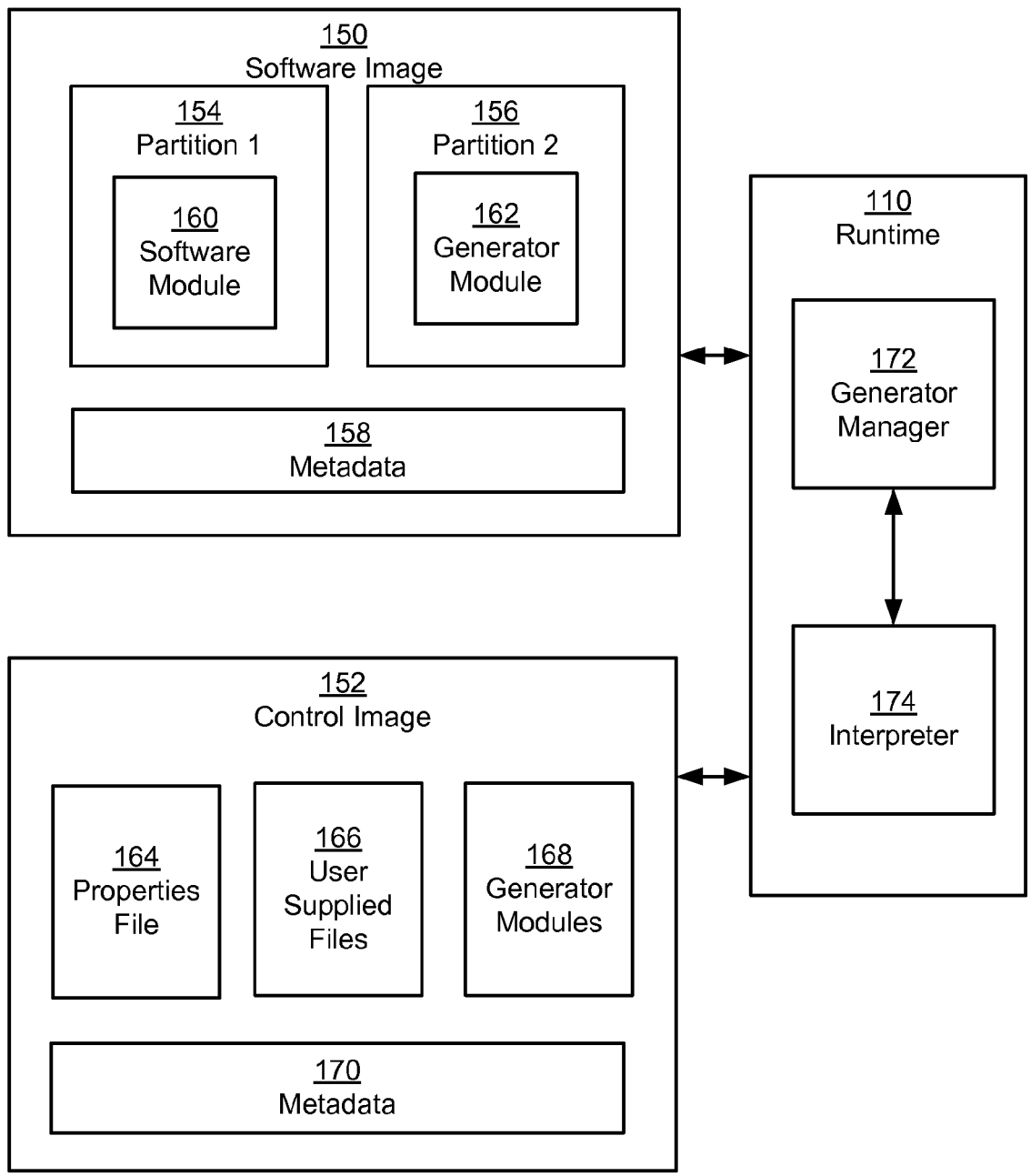

FIGS. 1 and 2 show schematic diagrams in accordance with one or more embodiments of the invention. FIG. 1 shows a schematic diagram of one type of execution environment that is a virtualized environment in accordance with one or more embodiments of the invention. As shown in FIG. 1, the virtualized environment may be located on a node (100). In one or more embodiments of the invention, a node is a computing device that includes hardware and software. For example, a node may be a personal computer, a workstation computer, a server, a mobile device, or any other type of computer system. Further, the node (100) may be a part of a distributed computer system, such as a server cluster (i.e., each node is a server), multiple processors with shared memory system (i.e., each node is a processor), several interconnected servers, or a group of computers connected over the Internet.

The node (100) may include hardware (102) and software (not shown) in accordance with one or more embodiments of the invention. In one or more embodiments of the invention, the hardware (102) includes the physical devices on a node (100). For example, the hardware (102) may include one or more processors (not shown), memory (not shown), and peripheral devices (e.g., storage drives, monitors, etc.). In one or more embodiments of the invention, software executes on the hardware (102) of the node (100).

In one or more embodiments of the invention, the software includes a guest domain (104), a host domain (106), and a hypervisor (108). The guest domain (104) and the host domain (106) are partitions of the resources available on the node (100). The partitioning of resources may be in terms of space (e.g., memory), time and space (e.g., processor or micro-core of a processor), or time.

In one or more embodiments of the invention, a domain is a type of virtual machine within which a program may execute. Specifically, domains provide a method for containment of software and a separation of software from hardware (102). For example, domains may be used to prevent software failures in a single domain from causing another failure in the system. Each domain may be allocated disjoint or non-overlapping physical memory.

In one or more embodiments of the invention, the guest domain (104) is a type of domain with access limited to virtual resources. A virtual resource is a layer of indirection to represent the physical resources, such as the hardware, of the node. Specifically, in one or more embodiments of the invention, programs in the guest domain (104) perform functions that are wholly contained in the guest domain (104). For example, programs in the guest domain (104) may be unable to directly control hardware (102), access memory of other domains, or manage the execution of all applications, including on other domains of the node (100). The guest domain (104) includes functionality to execute a guest domain operating system (not shown).

In one or more embodiments of the invention, the guest domain operating system includes functionality to manage the execution of processes in the guest domain (104). In one or more embodiments of the invention, the guest domain operating system operates as if it has sole control of the hardware (102). Specifically, the guest domain operating system operates as if the guest domain operating system is the only operating system on the node (100) and the resources (e.g., processor cycles, memory) allocated to the guest domain (104) are the only resources available on the node (100). Thus, the guest domain operating system includes functionality to control the operating environment of applications executing in the guest domain (104).

As shown in FIG. 1, the guest domain (104) includes a runtime (110) in accordance with one or more embodiments of the invention. In one or more embodiments of the invention, the runtime (110) includes functionality to create configuration files for each of the software modules in the guest domain (104). The runtime (110) is discussed in FIG. 2.

In one or more embodiments of the invention, a software module is a program or portion thereof that requires a separate configuration file. For example, a software module may be an operating system, an application, or a portion of the operating system or application, such as a service provided by the operating system.

In addition to the guest domain (104), the node (100) also includes a host domain (106). In one or more embodiments of the invention, the host domain (106) has a separate address space and operating system environment than the guest domain (104). The host domain (106) includes a host domain operating system (112). The host domain operating system (112) includes functionality to execute software to perform tasks on behalf of the node (100) and the guest domain (104). For example, the host domain software may include functionality to configure the hypervisor (108), perform communications with a physical device for other domains (e.g., guest domain (104)), create, destroy, and configure guest and driver domains, and functionality to perform the management of the node (100).

Continuing with FIG. 1, the hypervisor (108) includes functionality to control the sharing of hardware resources on the node (100). Specifically, the hypervisor (108) includes functionality to virtualize the physical devices of the node so that more than one operating system may share the same physical device transparently, in accordance with one or more embodiments of the invention. Further, the hypervisor (108) controls when the guest domain (104) and the host domain (106) are allowed to execute. For example, the hypervisor (108) may be a thin privileged layer of software that only manages the switch between the guest domain (104) and the host domain (106).

While FIG. 1 shows one or more embodiments of the invention in which the hypervisor (108) executes directly on the hardware, the hypervisor (108) may alternatively execute on a host operating system without departing from the scope of the invention. In one or more embodiments of the invention, the host operating system may exist in a layer between the hypervisor (108) and the hardware (102). For example, the host operating system may be used to support more types of hardware. Further, while FIG. 1 shows a host domain (106) as a separate domain, the host domain may be a part of the hypervisor (108) or a part of the host operating system. Further, the host domain (106) may be multiple domains. For example, the host domain (106) may include a separate domain for each physical device driver to handle physical I/O, a separate domain to control the hypervisor, etc.

The execution environment of software modules corresponds to the hardware and software resources available to the software module. For example, the execution environment of software modules in the guest domain (104) include only the hardware resources allocated to the guest domain (104) by the hypervisor (108) in accordance with one or more embodiments of the invention. For software modules that are applications or portions of an application, the execution environment may also include the guest domain operating system.

Although FIG. 1 shows one type of execution environment, the configuration files may be created for executing the software modules in other types of execution environments without departing from the scope of the invention. Specifically, the virtualized execution environment shows only an example execution environment in which embodiments of the invention may be performed. Other execution environments are also possible without departing from the scope of the invention. In particular, the execution environment may be a non-virtualized environment. In such scenario, the execution environment of the software modules is the entire node including all hardware and software on the node. For example, the execution environment may be a personal computer, a mobile device, a workstation computer, a server, or any other type of computer system.

FIG. 2 shows a schematic diagram of a system for generating configuration files in accordance with one or more embodiments of the invention. As shown in FIG. 2, the system includes a software image (150), a control image (152), and a runtime (110) in accordance with one or more embodiments of the invention. Each of these components is described below.

In one or more embodiments of the invention, the software image (150) is a copy of a recorded medium in which the software module (160) is preinstalled. Specifically, rather than requiring installation, a software image (150) provides a technique whereby the software module (160) can be mounted and executed directly from the storage medium on which the software image (150) is stored. Mounting is a process by which the software image (150) is accessible to the operating system. In one or more embodiments of the invention, the software image (150) is immutable. Specifically, data in the software image (150) cannot be changed. In one or more embodiments of the invention, the software image (150) includes at least two partitions (e.g., partition 1 (154), partition 2 (156)) and metadata (158).

In one or more embodiments of the invention, partition 1 (154) is a file system partition that includes the software module (160). As discussed above, the software module (160) includes the files to execute the software module (160). Further, in one or more embodiments of the invention, the software module (160) is arranged in the partition in a manner that the software module (160) may be directly executed from the storage location of partition 1 (154).

In one or more embodiments of the invention, partition 2 (156) is a file system partition that includes a generator module (162) for the software module (160). The system partition may include more than one generator module (162) in accordance with one or more embodiments of the invention. The generator module (162) includes functionality to create a configuration file for the software module (160) in the software image (150). Specifically, the generator module (162) includes information about the properties required by the software module (160) for the software module's configuration file(s). In one or more embodiments of the invention, the generator module (162) is provided access to a properties repository (not shown).

In one or more embodiments of the invention, the properties repository is a storage system that contains a full set of the system properties. Accordingly, the properties repository provides a centralized storage for configuration properties of the execution environment in which the software modules execute. In one or more embodiments of the invention, only a single properties repository exists for an execution environment. The single properties repository is shared amongst all generator modules generating configuration files for the execution environment.

Properties in the properties repository may include a name and a value. The name of the property may be defined hierarchically. In such a scenario, the hierarchy may correspond to the hierarchy between components of the execution environment. For example, an internet protocol (IP) address is a part of the network of the computer system. In such an example, the IP address may be shown as a child of a network in the hierarchy. The name may represent parent child relationship with a period between the parent component and the child component. The use of a hierarchy provides a technique for a flat list of properties to be easily extendible and prevent naming conflicts in accordance with one or more embodiments of the invention. For example, an additional property may be added by determining which, if any, components in the hierarchy that are related to the additional property and naming the additional property with the name of the components concatenated with a unique name for the property.

In one or more embodiments of the invention, a hierarchy allows a generator module (162) to iterate over a subset of the properties. For example, the generator module (162) may specify a wild card indicator, such as "*", as part of the name of the property desired. Other characters may be used as the wildcard without departing from the scope of the invention.

The following is for example purposes only and not intended to limit the scope of the invention. The following is an example of properties as they may be listed in the properties repository:

```
system.dns.domain = "myDomainName.com"
system.network.dns.nameserver.0 = "129.146.12.1"
system.network.dns.nameserver.1 = "129.147.12.1"
system.network.dns.nameserver.2 = "129.147.12.2"
databasetype.db.topdir = "/opt/myDatabaseNameFile"
```

As shown in the above example, the property providing the domain of the system is named system.dns.domain, where dns is domain name system. The value associated with the name is "myDomainName". Further, using the above example, the generator module (162) may iterate through the network domain name servers in the above example by referring to all servers in the list as "system.network.dns.nameserver.*" in order to obtain the internet protocol (IP) address of each of the DNS nameservers. The use of the "*" wildcard indicates a reference to all properties that start with "system.network.dns.nameserver".

The above description provides only a portion of the properties that may be in the properties repository. The properties repository may include other properties not discussed above. For example, the properties may include name-service switch properties, network interface attributes properties, services (e.g., secure shell daemon service (sshd)) properties (e.g., whether the service is enabled or disabled, attributes of the service, priority level of the service), properties defining the location of JAR files, and other properties.

Returning to the generator module (162), the generator module (162) includes functionality to generate one or more configuration file from the properties repository. The generator module (162) includes functionality to identify properties in the properties repository, obtain the values from the properties, and store the properties in the configuration file in accordance with the format requirements of the software module (160). Specifically, the generator module (162) includes functionality to store properties in the configuration file in a manner that complies with the syntax of the software module (160). In one or more embodiments of the invention, the generator module (162) may be an executable or a script. As a script, the generator module (162) includes functionality to direct the performance of the above actions. In one or more embodiments of the invention, the generator module (162) may be written in any programming language or scripting language.

In one or more embodiments of the invention, when the generator module (162) is a script, the generator module (162) may comply with a configuration templating language. In one or more embodiments of the invention, the configuration templating language uses tags to define the start and stop of a mode of the generator module (162). A mode defines how the generator module (162) is interpreted in accordance with one or more embodiments of the invention. For example, a print mode indicates that the data within the print tags are to be printed directly to the configuration file; a script mode indicates that the data within the script tags includes instructions which are to be performed; and a literal mode indicates that all data between the literal tags are to be copied to the configuration file including escape characters and mode changes, except for the ending literal mode tag. Thus, the literal mode may be used to include characters in the configuration file that would otherwise cause an escape out of the print mode. The configuration templating language may include a symbolic link mode to create a symbolic link to another file, a remove mode to remove a file, and other modes not discussed above.

As discussed above, the script mode indicates that instructions within the script tags are to be interpreted. The instructions may include a reference to properties in the properties repository. In one or more embodiments of the invention, the reference is by the name of the property. The following is an example in accordance with one or more embodiments of the invention:

```
<*script*>
    print "domain = " system.dns.domain;
    print "nameserver 0 = " system.network.dns.nameserver.0;
    print "nameserver 1 = " system.network.dns.nameserver.1;
<*script*>
```

When interpreted using the properties of the previous example, the above script may result in the following output:

```
            domain = myDomainName.com;
            nameserver 0 = 129.146.12.1;
            nameserver 1 = 129.147.12.1;
```

As shown in the above example, the properties in the output configuration file may have a different format than the properties in the properties repository. Specifically, the generator module (162) may customize the output to the configuration file according to the specific format requirements of the software module (160). Thus, even when the software modules have heterogeneous format requirements, the same properties repository may be used for each generator module (160). Thus, two or more generator modules may obtain identical properties from the properties repository. For example, the two or more generator modules may both obtain the property domain=myDomainName.com.

Continuing with the configuration templating language, the configuration templating language may also provide keywords, such as for iterating through a set of properties (e.g., a for loop), defining variables, and concatenating strings in accordance with one or more embodiments of the invention. For example, a variable may be used in a generator module (162) to define a base (e.g., "system.network.dns.nameserver") of a property and a wildcard (e.g., "*") may be used for the remainder of the property. Further, in one or more embodiments of the invention, the scripting language includes keywords for conditional expressions, such as for determining whether a property is defined in the properties repository. The above is only an example of some of the functionality in a configuration templating language, the configuration templating language may include different or additional functionality without departing from the scope of the invention. Further, the generator module (162) may comply with an alternative programming language without departing from the scope of the invention.

In one or more embodiments of the invention, the generator module (162) may be defined for more than one software image (150). Specifically, the generator module (162) may include functionality to generate configuration files for multiple different software modules (160).

Continuing with FIG. 2, the software image also includes metadata (158) in accordance with one or more embodiments of the invention. The metadata (158) may be used to describe the software image (150). For example, the software image metadata (158) may include an image name, a version number, and other such information.

In one or more embodiments of the invention, the system also includes a control image (152). The control image (152) provides information to create a new execution environment in accordance with one or more embodiments of the invention. In one or more embodiments of the invention, the control image is built by a user defining the new execution environment. In one or more embodiments of the invention, the control image (152) includes a properties file (164), user supplied files (166), one or more generator modules (168), and metadata (170).

In one or more embodiments of the invention, the properties file (164) may define the initial configuration properties of the execution environment. For example, the properties file (164) may include information for accessing the network and other properties of the new computer system. In one or more embodiments of the invention, the properties file is created by the user submitting values for the configuration properties using the runtime (110). Additionally or alternatively, the user may supply the user-supplied files (166). The user-supplied files (166) may include one or more files with configuration properties.

In one or more embodiments of the invention, the control image (152) includes generator modules (168). The generator modules (168) in the control image (152) may include generator modules supplied by the user to replace one or more generator modules (162) in the software image (150). For example, if the user desired to use one or more pre-defined software images (150), the user may provide supplemental generator modules (168) that replace the generator modules (162) in the software images (150).

Continuing with FIG. 2, in one or more embodiments of the invention, the control image metadata (170) includes a name for the control image, a root set parameter, a copy-up parameter, and a search order. The name of the control image uniquely identifies the control image (152).

In one or more embodiments of the invention, the root set defines an ordering by which the software images (150) are unionized. Further, the ordering in the root set may correspond to an order in which the generators are executed for each software module of the execution environment.

In one or more embodiments of the invention, the copy-up parameter provides a name of a copy-up image. A copy-up image provides a space to store changes made to the software images. Specifically, in embodiments in which the software image is immutable, the copy-up image provides a space to store the changes. In one or more embodiments of the invention, the search order provides an ordering of devices to search when searching for the software images (150). For example, the search order may specify to search for disk 1, then disk 2, then flash drive, etc.

Continuing with FIG. 2, the runtime (110) provides a system for creating the configuration files when the execution environment is executing. Specifically, the runtime (110) includes functionality to create a union file system from the image files and start execution of the generator modules. In one or more embodiments of the invention, the runtime (110) includes a generator manager (172) and an interpreter (174).

The generator manager (172) includes functionality to create the properties repository, and identify and execute generator modules (e.g., generator module (162), generator module (168)) for each software module (160). In one or more embodiments of the invention, the generator manager (172) includes functionality to determine whether the generator module (e.g., generator module (162), generator module (168)) is a script or an executable. The generator manager (172) further includes functionality to start the interpreter (174) when the generator module (e.g., generator module (162), generator module (168)) is a script. The interpreter (174) includes functionality to interpret the generator module (e.g., generator module (162), generator module (168)) in accordance with one or more embodiments of the invention.

Alternatively, software images (150) may include a separate interpreter. Further, in one or more embodiments of the invention, each software image may include libraries for the generator module (e.g., generator module (162), generator module (168)). In such embodiments, the generator manager (172) may be configured to create a virtual file system that can be written to, copy the generator module to the virtual file system, and execute the generator module using the virtual file system as the effective root directory.

Although FIG. 2 shows the use of a software images (150) and a control image (152), the system may include a disk image that includes the file system for one or more of the software modules. The file system may include the generator modules in the same directory or in a separate directory of the file system. For example, in a non-virtualized environment, the runtime may be triggered when loading the operating system. For example, after the root file system of the operating system is loaded, the runtime may start executing. In such scenario, the runtime may include functionality to identify the generator modules and execute each generator module to create configuration files for node. In one or more embodiments of the invention, configuration files are created at each boot up of the node. Alternatively, the generator modules may be executed only after a change is detected in the properties repository.

Figure 3:
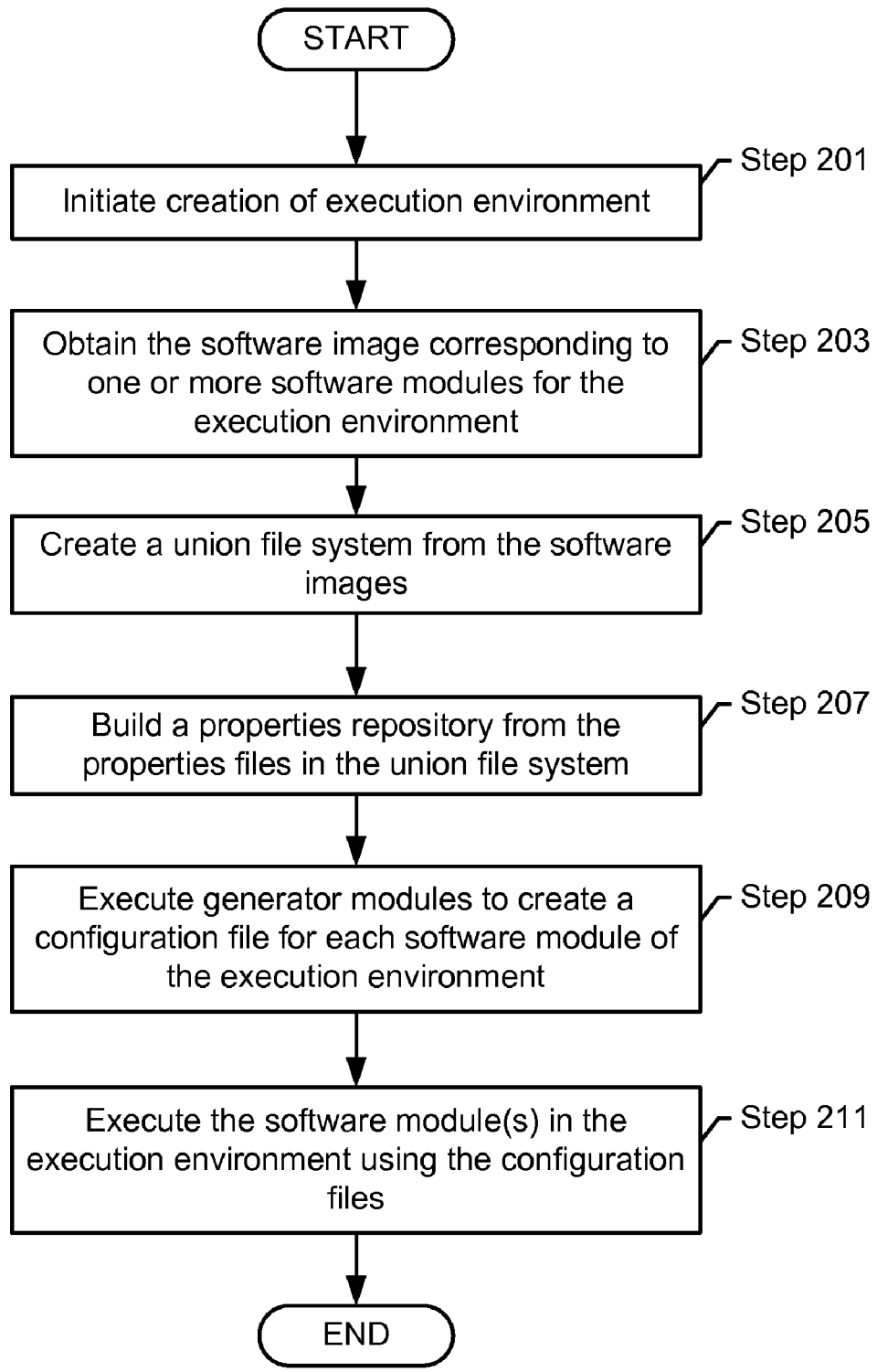
FIGS. 3 and 4 show flowcharts in accordance with one or more embodiments of the invention.
Figure 4:
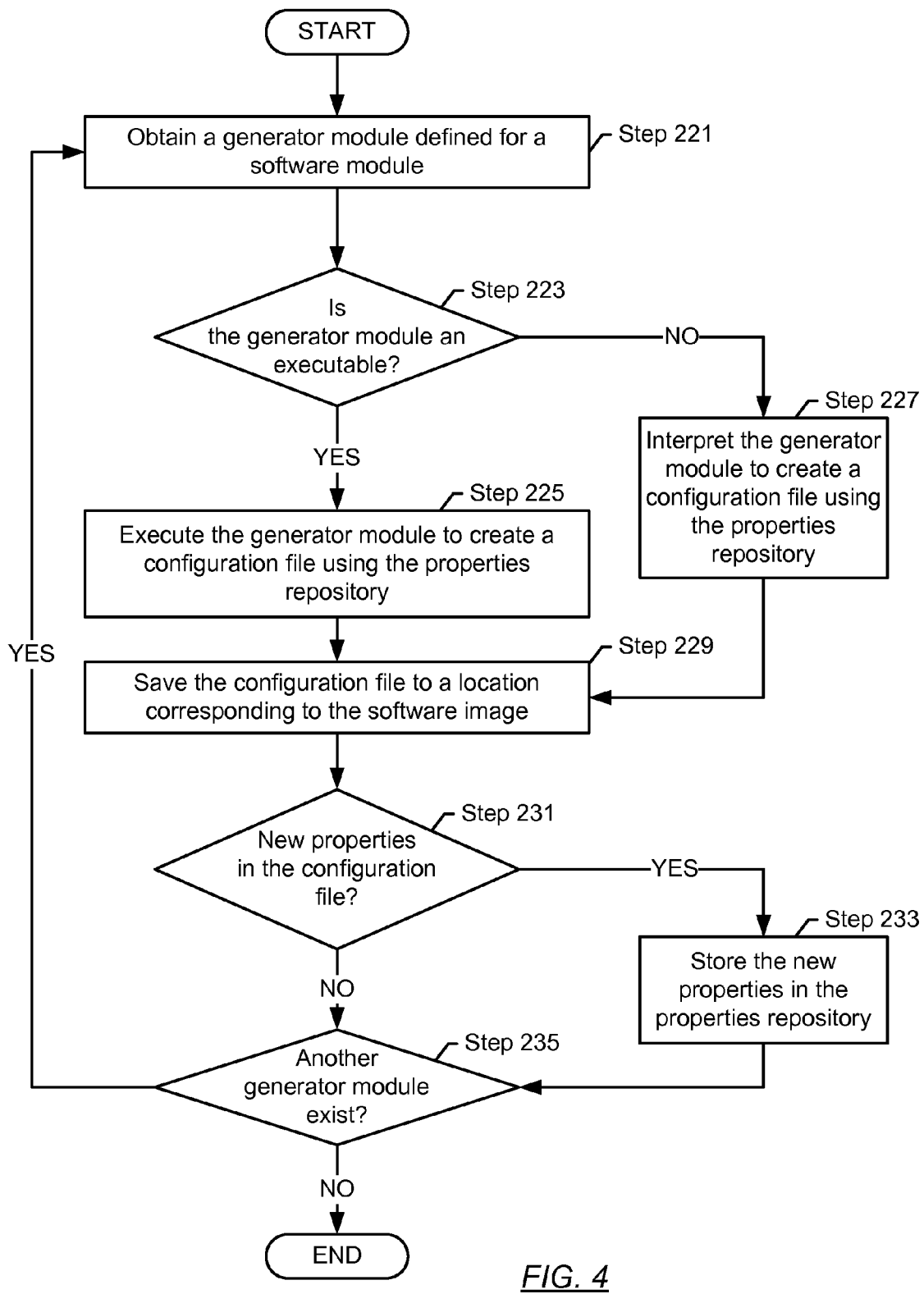

FIGS. 3 and 4 show flowcharts in accordance with one or more embodiments of the invention. While the various steps in these flowcharts are presented and described sequentially, one of ordinary skill will appreciate that some (or all) of the steps may be executed in different orders, may be combined or omitted, and some or all of the steps may be executed in parallel. In addition, steps such as store acknowledgements have been omitted to simplify the presentation.

In one or more embodiments of the invention, the control image is built by a user. Building the control image may be performed, for example, by a user using a graphical user interface (GUI) of a control image builder. Using the GUI, the user may select pre-defined software images for the execution environment, provide additional user-defined software images, provide additional files, specify properties, and specify a search order for hardware devices.

In one or more embodiments of the invention, the user may define a virtual environment to execute the software modules. For example, the user may specify parameters defining virtual hardware resources (e.g., processor, memory, swap space, virtual machine name, and other such parameters).

FIG. 3 shows a flowchart for creating an execution environment in accordance with one or more embodiments of the invention. In Step 201, creation of the execution environment is initiated. In one or more embodiments of the invention, initiation of the execution environment includes starting a real environment (e.g., a node) or a virtual environment (e.g., a guest domain on a node). A boot loader on the real or virtual environment loads a kernel and the software module responsible for initialization of the root file system into memory. In response, the kernel executes a root file system initialization module. The execution of the root file system initialization module initiates a runtime in accordance with one or more embodiments of the invention.

In one or more embodiments of the invention, the runtime searches for and obtains a control image. Specifically, the runtime may search devices for data matching a control image. The aforementioned steps may be performed, for example, during a boot up process prior to the kernel mounting the root file system. Specifically, instead of a kernel module mounting the root file system, the runtime may identify the control image and create the execution environment using information provided by the control image.

In Step 203, the software images corresponding to one or more software modules are obtained for the execution environment. Specifically, the runtime accesses the control image to determine which software images are specified for the execution environment. In one or more embodiments of the invention, the software images are specified in the root set of the control image metadata.

In Step 205, a virtual file system is created from the software images. In one or more embodiments of the invention, the runtime creates the virtual file system by identifying, from each software image, the partition containing the software module. The runtime may mount a "copy up" image for writing data, mount the control image, and then mount the file system for each software module from the partition in the order defined by the root set parameter of the control image in accordance with one or more embodiments of the invention.

In Step 207, a properties repository is built from the properties files in the union file system. Specifically, the generator manager may access and combine the properties file of the control image with the user-supplied files that have configuration properties to create the properties repository.

In Step 209, the generator modules are executed to create a configuration file for each software module of the execution environment in accordance with one or more embodiments of the invention. FIG. 4 shows a flowchart for executing the generator modules in accordance with one or more embodiments of the invention.

In one or more embodiments of the invention, the runtime creates a new virtual file system that includes the copy up image, an immutable file system containing the configuration files, the software portion of the control image, and the file system for each software module from the partition containing the software module. Thus, while the generator modules executes, the generator modules write data to the configuration files. However, after execution of the generator modules, the configuration files are read-only in accordance with one or more embodiments of the invention.

Continuing with FIG. 3, in Step 211, one or more software modules are executed in the execution environment using the configuration files in accordance with one or more embodiments of the invention. Specifically, software modules may begin executing in the execution environment.

Although FIG. 3 shows the software modules as executing after all of the configuration files are generated, a portion of the software modules may begin executing after the configuration files for the portion is generated. For example, the configuration files may be generated on an as-needed basis. Critical software modules (i.e., software modules that are required to execute the operating system) may include corresponding configuration files generated during boot up of the execution environment. Thus, the critical software modules can execute as part of the boot up of the execution environment. In contrast, configuration files for non-critical software modules may be generated only immediately prior to the execution of the non-critical software module, such as when an application requests a service from the operating system that requires the non-critical software module. Alternatively, the configuration files may be generated lazily, such as when processing resources are available and prior to when the software module is requested.

FIG. 4 shows a flowchart for executing the generator modules in accordance with one or more embodiments of the invention. In one or more embodiments of the invention, the generator modules are executed in an order defined by the control image. In Step 221, a generator module defined for a software module is obtained in accordance with one or more embodiments of the invention. In one or more embodiments of the invention, the generator manager determines whether the user has provided a generator module for the software module. If the user has provided a generator module, then the generator module is used to generate the configuration file. If the user has not provided the generator module, then the generator manager accesses the generator module from the software image. At this stage, the generator manager may access the generator module using the union file system.

In Step 223, a determination is made whether the generator module is an executable. If the generator module is an executable, the generator module is executed to create a configuration file using the properties repository in accordance with one or more embodiments of the invention (Step 225). Specifically, execution is transferred to the generator module. In one or more embodiments of the invention, the generator manager provides the properties repository to the generator module as input to the generator module. For example, the generator manager may receive a file descriptor of a file containing the properties repository. The generator manager may provide the properties repository to the generator module using other techniques without departing from the scope of the invention.

The generator module obtains the values for the properties from the properties repository and stores the values in a configuration file for the software module. In one or more embodiments of the invention, accessing the properties repository includes opening a file having the properties. The generator module may, using a file descriptor for the file, identify the property by the name of the property and obtain the value corresponding to the name. In one or more embodiments of the invention, the storage of the values complies with the format required by the software module.

Alternatively, if the generator module is not an executable, then an interpreter is called to interpret the generator module to create a configuration file using the properties repository in accordance with one or more embodiments of the invention (Step 227). Specifically, the generator manager may transfer control to the interpreter. The interpreter may interpret the generator module. As discussed above, the generator manager may provide, as input, access to the properties repository for the generator module.

In one or more embodiments of the invention, the generator module, through the interpreter, obtains the values for the required properties from the properties repository and stores the values in the configuration file(s). As discussed above, the generator module may access the properties repository using a file descriptor for the properties repository. The generator module may store the properties in a configuration file(s) by using a file descriptor for the configuration file in accordance with one or more embodiments of the invention.

Regardless of whether the generator module is an executable, the configuration file(s) is saved to a location corresponding to a software module (Step 229). Specifically, the configuration file(s) is stored on a hardware storage device for use by the software module.

In one or more embodiments of the invention, the generator module may include additional properties not specified in the properties repository. The instructions of the generator module may include a value for the additional property. Alternatively, the instructions may specify how to obtain the values for additional properties from the execution environment. If the instructions specify how to obtain the value for the additional property, then the value is obtained according to the instructions.

In Step 231, a determination is made whether new properties exist in the configuration file(s) in accordance with one or more embodiments of the invention. For example, the generator module may provide, as output, the new properties to the generator manager. If new properties exist in the configuration file(s), then the new properties are stored in the properties repository in accordance with one or more embodiments of the invention (Step 233). Specifically, the properties are added to the properties repository in the format used by the properties repository. Thus, the properties repository may be updated with additional properties that may be used by other generator modules. Adding new properties may include updating values of properties already in the properties repository, or adding properties that do not already have a name or value in the properties repository.

In Step 235, a determination is made whether another generator module exists in accordance with one or more embodiments of the invention. If another generator module exists, then the execution of the next generator module is performed.

Figure 5:
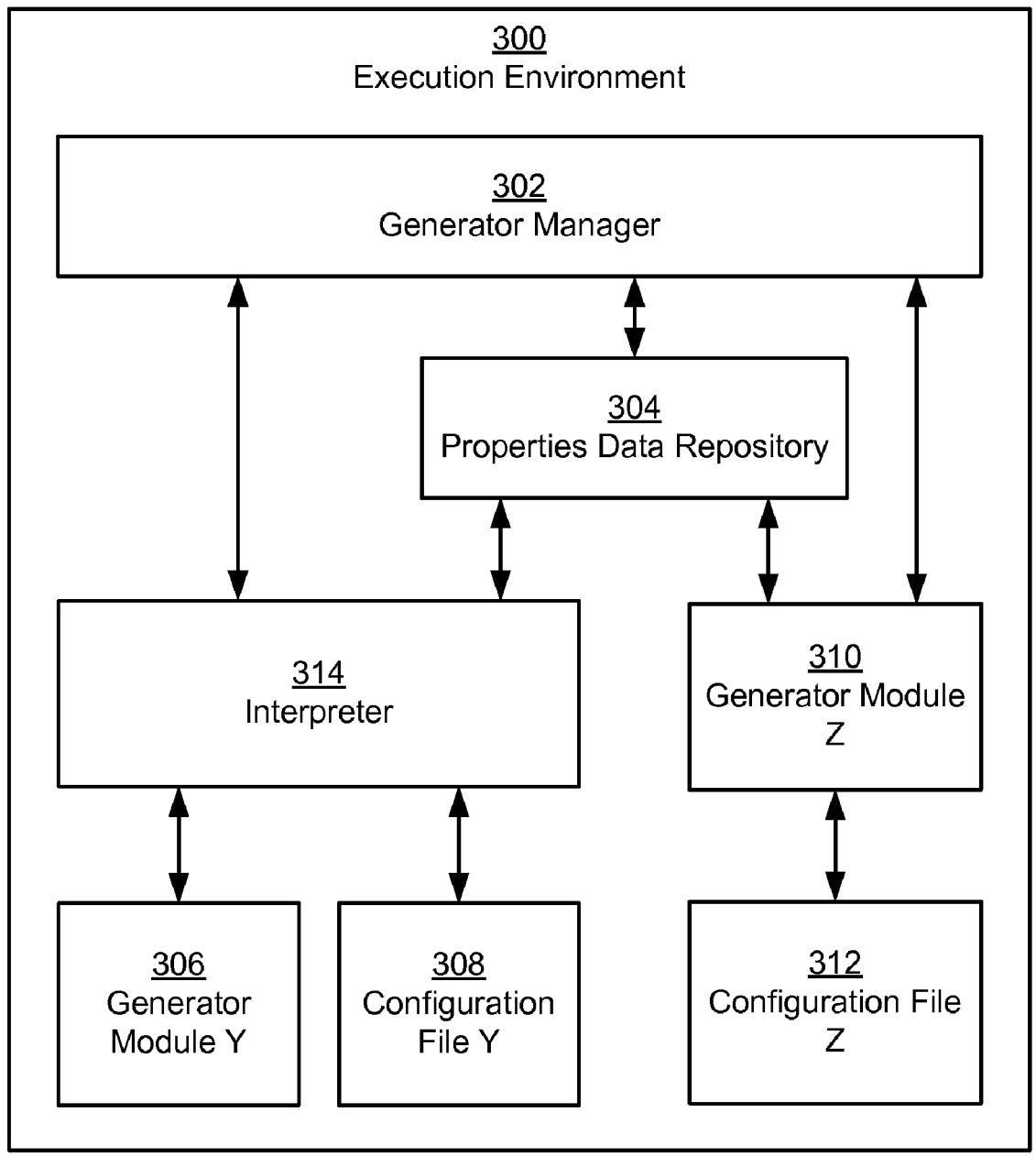
FIG. 5 shows a schematic diagram for an example in accordance with one or more embodiments of the invention.

FIG. 5 shows an example in accordance with one or more embodiments of the invention. The following example is for explanatory purposes only and not intended to limit the scope of the invention. FIG. 5 shows an example execution environment (300). The execution environment includes a generator manager (302) and a properties repository (304). For the following example, consider the scenario in which the properties repository (304) includes the following properties:

system.dns.domain = "myDomainName.com"
system.network.dns.nameserver.0 = "129.146.12.1"
system.network.dns.nameserver.1 = "129.147.12.1"
system.network.dns.nameserver.2 = "129.147.12.2"

```
system.network.interfaces.0.device = "eth0"
system.network.interfaces.0.ip = "129.168.1.2"
system.network.interfaces.0.netmask = "255.255.255.0"
system.network.interfaces.0. hwaddr = "00:14:4f:80:D7:22"
system.network.interfaces.0.gateway = "192.168.1.255"
system.network.interfaces.0.type = "Ethernet"
```

In the example, the generator manager (302) identifies software module Y (not shown) and obtains the generator module Y (306) defined for software module Y. The generator manager (302) determines that the generator module for software module Y (306) is a script. For the following example, consider the scenario in which the instruction in generator module Y includes:

```
<*script*>
    @iface = system.network.interface.0;
    print "type = " @iface.type;
    print "device = " @iface.device;
    print "ip = " @iface.ip;
    print "netmask = " @iface.netmask;
    print "gateway = " @iface.gateway;
    num = 0
    for (@server in system.network.dns.nameserver.*)
    {
        output = "nameserver" num " = " @server "\n";
        print output;
        num = num +1;
    }
<*script*>
```

Accordingly, the generator manager (302) initiates the interpreter (314) to interpret the generator module (306). As a result of the execution, the generator module (306) creates the configuration file Y (308). After interpreting generator module Y, the following shows the data in example configuration file Y (308):

```
type = Ethernet
device = eth0
ip = 129.168.1.2
netmask = 255.255.255.0
gateway = 192.168.1.255
nameserver0 = 129.146.12.1
nameserver1 = 129.147.12.1
nameserver2 = 129.147.12.2
```

As shown above, only a subset of the properties in the properties repository are used for the configuration file Y. Other properties may be used in different configuration files. In the example, the generator manager (302) identifies software module Z (not shown) and obtains the generator module Z (310) defined for software module Z. The generator manager (302) determines that the generator module for software module Z (306) is an executable. Accordingly, the generator manager executes generator module Z (310) to create the following configuration file Z:

```
network_interfaces_device      eth0
network_interfaces_ip          129.168.1.2
network_interfaces_netmask     255.255.255.0
network_interfaces_hwaddr      00:14:4f:80:D7:22
network_interfaces_gateway     192.168.1.255
network_interfaces_type        Ethernet
```

After the configuration files are created, the software module Y and software module Z can execute.

As shown in the above example, the use of the properties repository and the generator modules provides a technique whereby a property is defined once and applied to all configuration files that use the property. Moreover, if the value of a property is change, for example, because a new IP address is assigned, the value may be propagated to all configuration files by re-executing the generator modules. Thus, embodiments of the invention assist in creating consistency between the configuration files in accordance with one or more embodiments of the invention. Additionally, in one or more embodiments of the invention, users are not required to learn the format requirements of each software module. Specifically, the user that may modify the configuration file only updates the properties repository. The generator modules translate the updates to the format requirements of the software modules.

Figure 6:
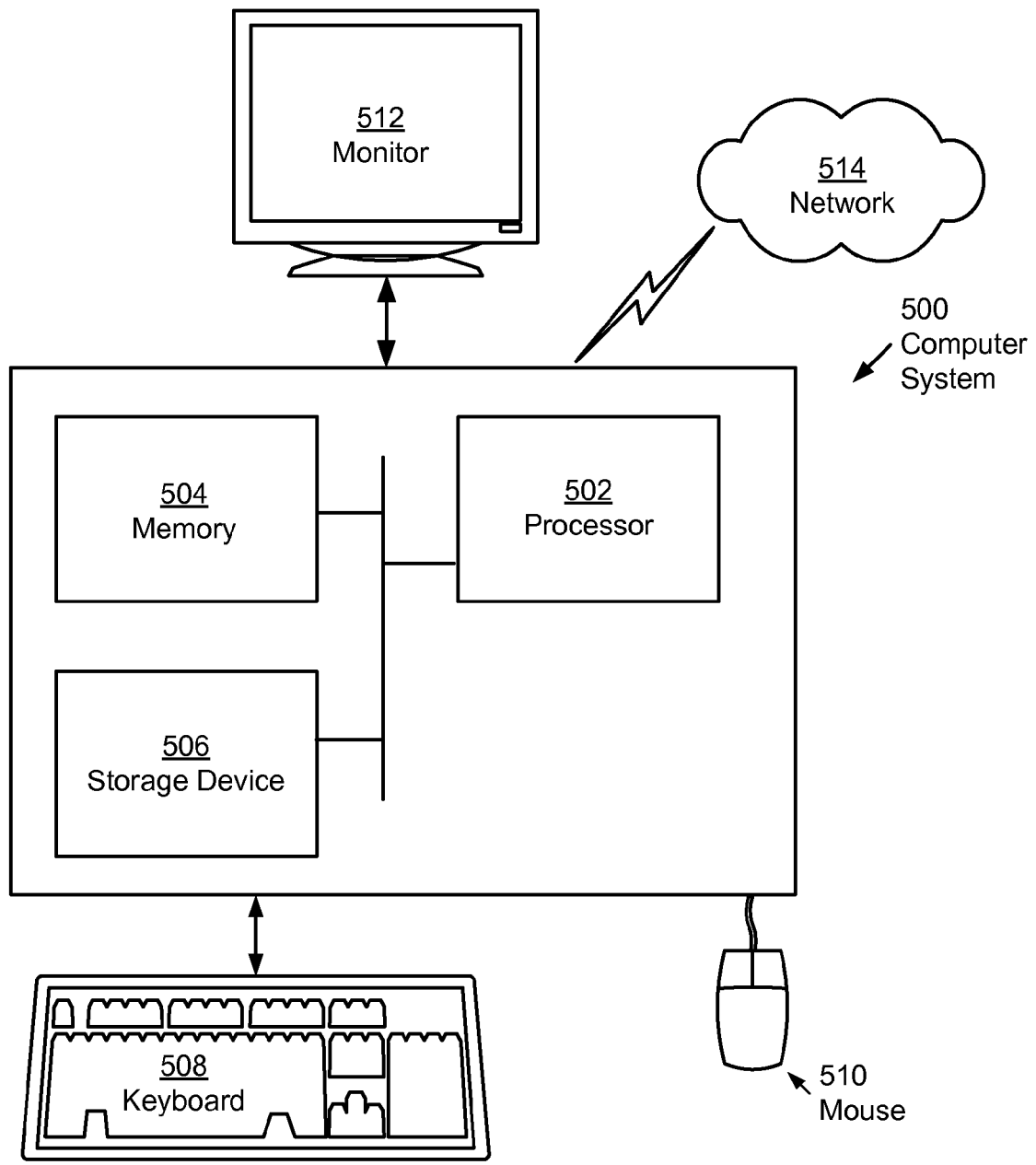
FIG. 6 shows a computer system in accordance with one or more embodiments of the invention.

Embodiments of the invention may be implemented on virtually any type of computer regardless of the platform being used. For example, as shown in FIG. 6, a computer system (500) includes one or more processor(s) (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for configuring a plurality of software modules to execute in an execution environment on a computer system, comprising:
   accessing a properties repository comprising a plurality of properties of the execution environment of the computer system, wherein each of the plurality of properties comprises a name and a value;
   generating a configuration file for each of a plurality of software modules using the properties repository by:
      obtaining a generator module defined for the software module;
      executing the generator module on the computer system to instantiate the configuration file for the software module, wherein the generator module is configured to:
         identify a property of the plurality of properties required for the configuration file;
         obtain the value for the property from the properties repository; and
         store the value for the property in the configuration file in accordance with a customized format required by the software module; and
   storing the configuration file for each of the plurality of software modules,
   wherein the generator module for each of at least two software modules of the plurality of software modules references an identical property in the properties repository.

2. The method of claim 1, wherein generating the configuration file for at least one of the plurality of software modules is performed after initiating boot up of the computer system and prior to initiating a load routine to start execution of an operating system in the execution environment.

3. The method of claim 1, wherein the execution environment is a virtualized execution environment.

4. The method of claim 1, wherein the plurality of software modules are located in a plurality of software images.

5. The method of claim 1, wherein each software image comprises the generator module defined for the software module.

6. The method of claim 1, wherein a software image comprises the generator module for each software module of the plurality of software modules.

7. The method of claim 1, wherein the generator module defined for at least one software module of the plurality of software modules is further configured to:
   obtain a new property required for the configuration file of the at least one software module, wherein the new property is not stored in the properties repository; and
   store a value for the new property in the configuration file in accordance with the customized format required by the at least one software module.

8. The method of claim 7, further comprising:
   identifying the new property stored in the configuration file of the at least one software module; and
   storing the new property in the properties repository.

9. The method of claim 1, further comprising:
   transmitting each of a plurality of software images comprising the plurality of software modules to each of a plurality of nodes in a cluster, wherein the plurality of nodes comprises a heterogeneous properties repository, and wherein each of the plurality of nodes executes the generator module using the heterogeneous properties repository on the node to create the configuration file customized for the node.

10. The method of claim 1, further comprising:
    extracting a properties file from a software image;
    accessing the plurality of properties from the properties file; and
    storing the plurality of properties in the properties repository.

11. A system for configuring a plurality of software modules to execute in an execution environment on a computer system comprising:
    a processor;
    a properties repository comprising a plurality of properties of the execution environment of the computer system, wherein the each of the plurality of properties comprises a name and a value; and
    a generator manager executing on the processor and configured to:
       generate a configuration file for each of the plurality of software modules using the properties repository by:
          obtaining a generator module defined for the software module;
          executing the generator module on the computer system to instantiate the configuration file for the software module, wherein the generator module is configured to:
             identify a property of the plurality of properties required for the configuration file;
             obtain the value for the property from the properties repository; and
             store the value for the property in the configuration file in accordance with a customized format required by the software module; and
       store the configuration file for each of the plurality of software modules,
       wherein the generator module for each of at least two software modules of the plurality of software modules references an identical property in the properties repository.

12. The system of claim 11, wherein generating the configuration file for at least one of the plurality of software modules is performed after initiating boot up of the computer system and prior to initiating a load routine to start execution of an operating system in the execution environment.

13. The system of claim 11, wherein the execution environment is a virtualized execution environment.

14. The system of claim 11, wherein the generator module defined for at least one software module of the plurality of software modules is further configured to:
    obtain a new property required for the configuration file of the at least one software module, wherein the new property is not stored in the properties repository;
    store a value for the new property in the configuration file in accordance with the customized format required by the at least one software module.

15. The system of claim 14, wherein the generator manager is further configured to:
    identify the new property stored in the configuration file of the at least one software module; and
    store the new property in the properties repository.

16. The system of claim 11, further comprising:
    an interpreter configured to interpret the generator module, wherein executing the generator module comprises initiating the interpreter to interpret the generator.

17. A non-transitory computer readable medium comprising computer readable program code embodied therein for causing a computer system to:
- access a properties repository comprising a plurality of properties of an execution environment of the computer system, wherein each of the plurality of properties comprises a name and a value;
- generate a configuration file for each of the plurality of software modules using the properties repository by:
  - obtaining a generator module defined for the software module;
  - executing the generator module on the computer system to obtain the configuration file for the software module, wherein the generator module is configured to:
    - identify a property of the plurality of properties required for the configuration file;
    - obtain the value for the property from the properties repository; and
    - store the value for the property in the configuration file in accordance with a customized format required by the software module; and
- store the configuration file for each of the plurality of software modules,
- wherein the generator module for each of at least two software modules of the plurality of software modules references an identical property in the properties repository.

18. The non-transitory computer readable medium of claim 17, wherein the plurality of software modules are located in a plurality of software images defined for a virtualized execution environment.

* * * * *